(12) United States Patent
Koch (10) Patent No.: US 6,177,981 B1
(45) Date of Patent: Jan. 23, 2001

(54) LOADING ARRANGEMENT AND FILM PLATFORM FOR APS FILM

(75) Inventor: Willy Koch, Otelfingen (CH)

(73) Assignee: Gretag Imaging AG, Regensdorf (CH)

( * ) Notice: Under 35 U.S.C. 154(b), the term of this patent shall be extended for 0 days.

(21) Appl. No.: 09/395,742

(22) Filed: Sep. 14, 1999

(30) Foreign Application Priority Data

Sep. 14, 1998 (EP) .............................. 98 117 362

(51) Int. Cl.⁷ .......................... G03B 27/58; G03B 27/52; G03B 27/62
(52) U.S. Cl. ................. 355/72; 355/40; 355/75
(58) Field of Search .................. 355/40, 72, 75

(56) References Cited

U.S. PATENT DOCUMENTS

| | | | |
|---|---|---|---|
| 4,417,811 | * 11/1983 | Hamer ..................... | 355/77 |
| 5,473,402 | * 12/1995 | Long et al. .............. | 355/40 |
| 5,493,352 | 2/1996 | Reddig et al. . | |
| 5,745,219 | * 4/1998 | DeMarti, Jr. et al. ................. | 355/40 |
| 5,767,943 | 6/1998 | Oberhardt et al. . | |
| 5,886,774 | * 3/1999 | Nishida et al. ......................... | 355/40 |
| 5,982,477 | * 11/1999 | Trafton et al. ......................... | 355/75 |
| 6,040,891 | * 3/2000 | Makino et al. ......................... | 355/46 |

FOREIGN PATENT DOCUMENTS

| | | |
|---|---|---|
| 0 717 310 A2 | 6/1996 | (EP) . |
| 0 814 371 A2 | 12/1997 | (EP) . |
| 0 851 291 A1 | 7/1998 | (EP) . |

* cited by examiner

*Primary Examiner*—Russell Adams
*Assistant Examiner*—Khaled Brown
(74) *Attorney, Agent, or Firm*—Burns, Doane, Swecker & Mathis, LLP (57) ABSTRACT

A loading arrangement for a photographic copier especially for APS film including film cartridges is disclosed wherein the films are partially removed from the cartridge for processing and after processing again rewound into the cartridge, including means for the positioning of a cartridge in a working position, motor-driven unwind means for the partial removal of the film from the cartridge which is present in the windup condition in the cartridge and for the transfer thereof to film transport means provided in the copier apparatus, and motor-driven windup means for the rewinding of the film into the cartridge. Further provided are a storage chamber for coaxially receiving at least two cartridges in a defined orientation, as well as transfer means which fully automatically sequentially remove the cartridges found in the storage chamber from the storage chamber and bring them into the working position, partially remove the film present in the cartridge from the cartridge and transfer it to the film transport means and eject the cartridges after rewinding of the film thereinto.

9 Claims, 12 Drawing Sheets

ND FILM
LOADING ARRANGEMENT AND FILM PLATFORM FOR APS FILM

FIELD OF THE INVENTION

The invention relates to a loading arrangement for a film cartridge, especially a cartridge containing an APS film, as well as a film platform for a photographic copier apparatus especially for the processing of APS films.

BACKGROUND ART

The so-called APS films (Advanced Photographic System) which appeared in recent years, are distinguished, among other things, in that the storage and processing (with the exception of the developing) of the films always takes place in or out of the APS film cartridges especially constructed therefor, which means the films are not completely removed from the cartridges for the processing (again with exception of the developing) and after the processing rewound into the cartridge. Adjustable codings are further provided on the cartridges by way of which it can be determined whether an unexposed, a partially exposed, a completely exposed, or an already developed film is in the cartridge.

So-called minilabs or photographic copier apparatus which, apart from the actual copier part (exposure apparatus, printer), also include a developing section for the photographic copy material as well as possibly also a film developing section. Minilabs and other photographic copier apparatus are generally equipped with a so-called film platform which allows a precise feeding of the films to be copied into the exposure light path.

With minilabs for conventional films, for example, those of the 135 format, a film to be copied is manually or by way of a suited loading arrangement fed into the film platform and thereby passed onto the film transport means provided in the film platform. Those then transport the film along a film path and position the individual picture frames in the exposure window of the film platform where the exposure takes place. When the last picture frame is copied, the film is generally ejected from the film platform.

Minilabs adapted for the processing of APS films, because of the above-mentioned characteristics of such films, require a specially adapted film platform or loading arrangement for APS films. That is generally provided with a holding device for the positioning of an individual APS film cartridge in a defined orientation, as well as an unwind and windup mechanism which guides the APS film out of the cartridge and passes it to the film transport means of the film platform and rewinds the film after the copying process back into the cartridge. Subsequently, the cartridge can then be removed again from the loading arrangement.

Minilabs cover a capacity of up to 100 copy orders (individual films) per hour.

However, even at a lower capacity of, for example, 40 copy orders per hour, this means that the operator must install and remove an APS cartridge about every one and a half minutes. Thus, in order to be able to fully utilize the capacity of the minilab, the operator must practically continuously stand at the minilab.

SUMMARY OF THE INVENTION

With the present invention, the handling of a copy apparatus, especially a minilab shall now be simplified, especially for the processing of APS films so that the operator requires less time for the feeding of the film cartridges, especially APS film cartridges. In particular, with the present invention, a loading arrangement especially for APS film cartridges is to be improved such that several cartridges can be fed simultaneously. A further object of the invention resides in the corresponding improvement of a film stage for a photographic copy apparatus which is especially adapted for the processing of APS film.

According to the main idea of the invention, simultaneously, several APS cartridges or comparable film cartridges are loaded into a storage chamber and then sequentially fully automatically brought into the working position and subsequently ejected. The operator therefore needs to go less often to the minilab and is therebetween available for other activities.

DESCRIPTION OF THE DRAWINGS

The invention will be further described in the following by way of the drawing and in connection with APS film and APS film cartridges. It show.

DETAILED DESCRIPTION OF THE PREFERRED EMBODIMENT

Figure 1:
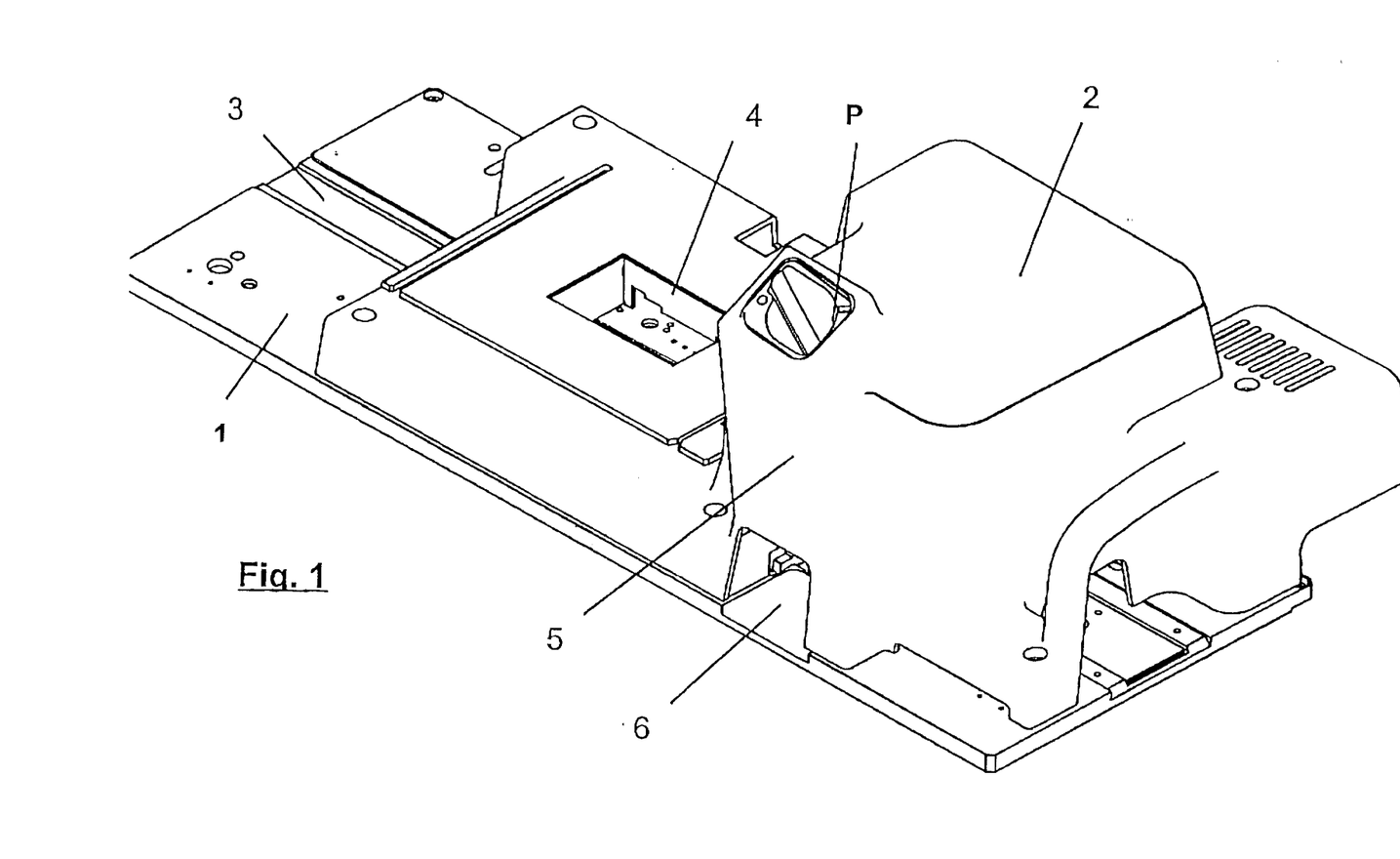
FIG. 1 an overview of one embodiment of a film stage in accordance with the invention.

The film platform shown in whole in FIG. 1 adapted for the processing of APS film has an essentially planar base plate 1, and a cover 2 mounted thereon. A film guide 3 is formed in the base plate 1, which defines a straight film transport path. An exposure window 4 is cut out of the cover 2 under which the film guide 3 passes and through which the exposure light path extends when the film platform is installed in a copier apparatus or minilab. Furthermore, a duct 5 is formed in the cover 2 which surrounds an essentially tubular storage chamber for APS film cartridges P as will be described in detail further below. At the bottom end of the duct, an ejection opening 6 is cut out.

Figure 2:
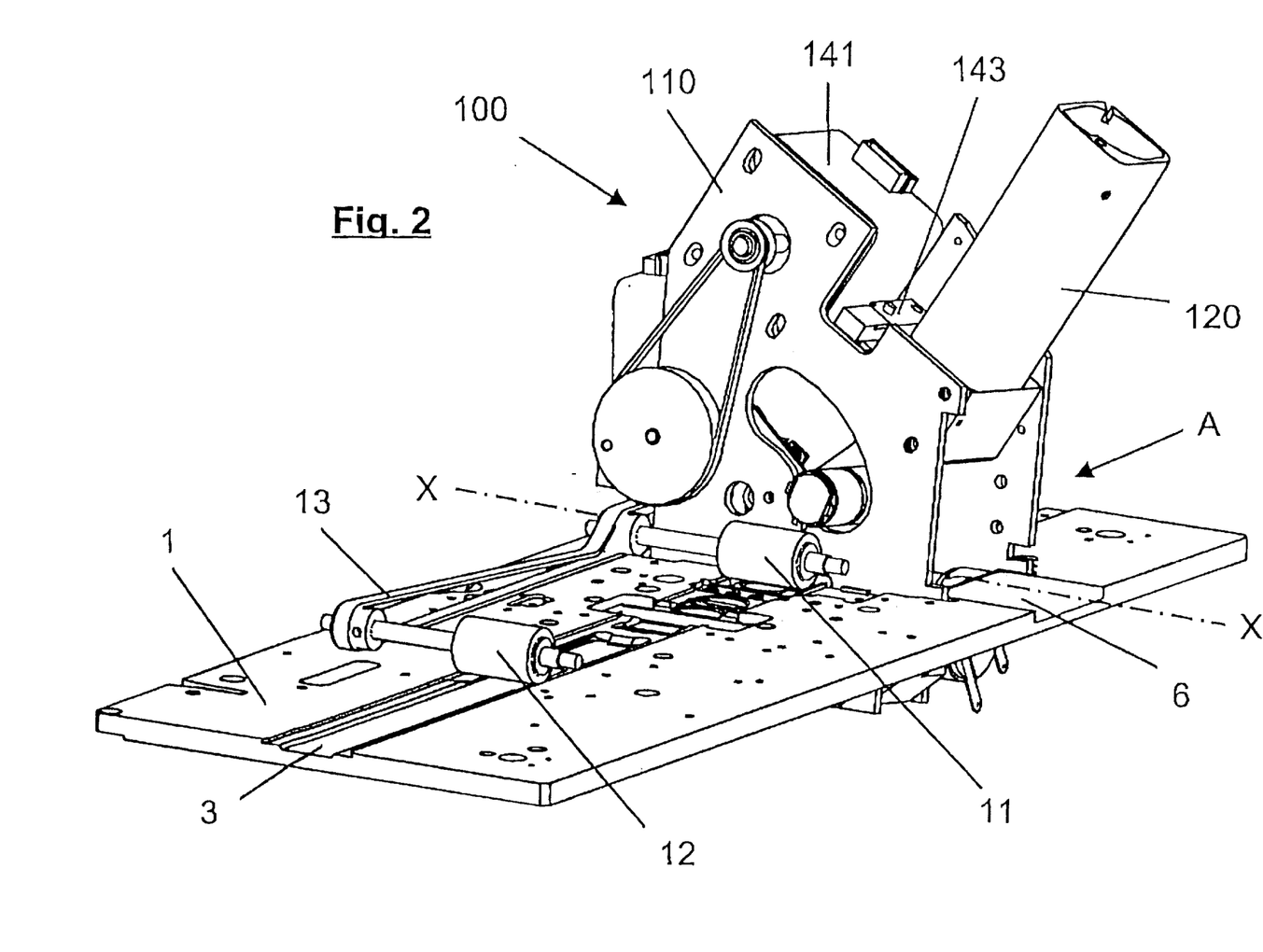
FIG. 2 an overview of the film stage with removed casing.

FIG. 2 shows the parts inside the exposure platform relevant for the invention. Two transport rollers 11 and 12 are apparent which are driven by a motor 14 shown in FIG. 10 and through a drive belt 13, as well as a loading arrangement for APS film cartridges designated as a whole by 100. The transport rollers 11 and 12, the drive belt 13 and the motor 14 together form film transport means which can transport an APS film passed thereto by the loading arrangement 100 along the film guide 3 forward and backward.

The loading arrangement 100 essentially includes a mounting frame 110 in which are mounted a stationary, tubular storage chamber 120 for several APS film cartridges P, a moveable transfer chamber 130 (FIG. 3) and a drive mechanism (FIG. 3) designated as a whole with 140 for the movement of the transfer chamber as well as a windup and unwind drive 150 (FIG. 6) for a cartridge P mounted in the transfer chamber. Furthermore, various sensors for the control of the movement flow which are discussed further below, are provided in the mounting frame 110. The drive mechanism 140 implements the movements described below by way of various, not characterized linkages, leavers and clamps, as well as a drive motor 141 which drives these parts.

The tubular storage chamber 12 which is open at both ends, has an inner cross section adapted to the outer shape of APS film cartridges and can simultaneously receive several, in the illustrated example 3, APS film cartridges P coaxially one behind the other or one above the other in a defined orientation. The transfer chamber 130 is internally analogously shaped, but can respectively receive only a single cartridge P in a defined orientation.

Figure 3:
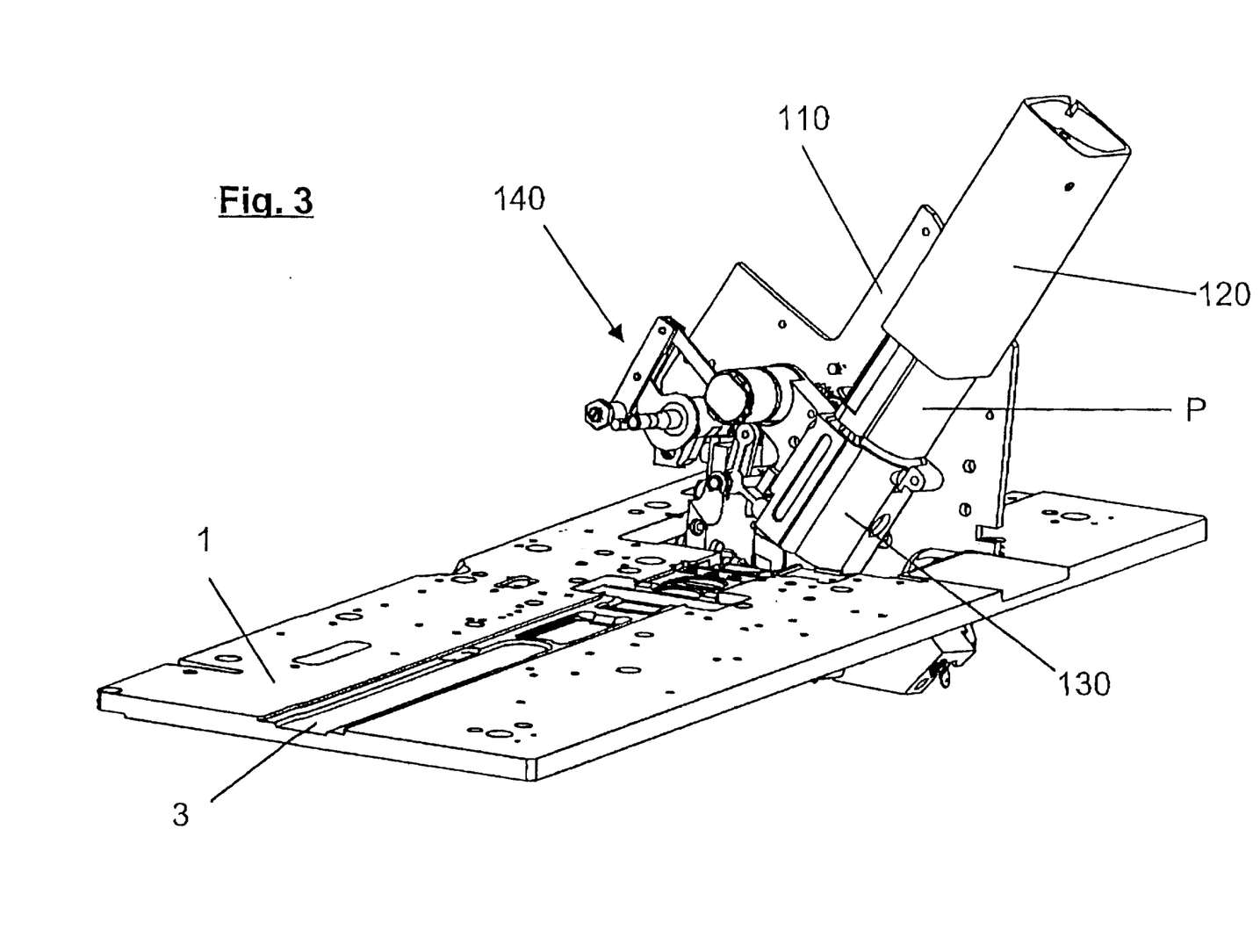
FIGS. 3 to 5 the inside of the film stage in three characteristic phases of movement of the loading arrangement associated with the film stage, whereby some components have been omitted for clarity.
Figure 4:
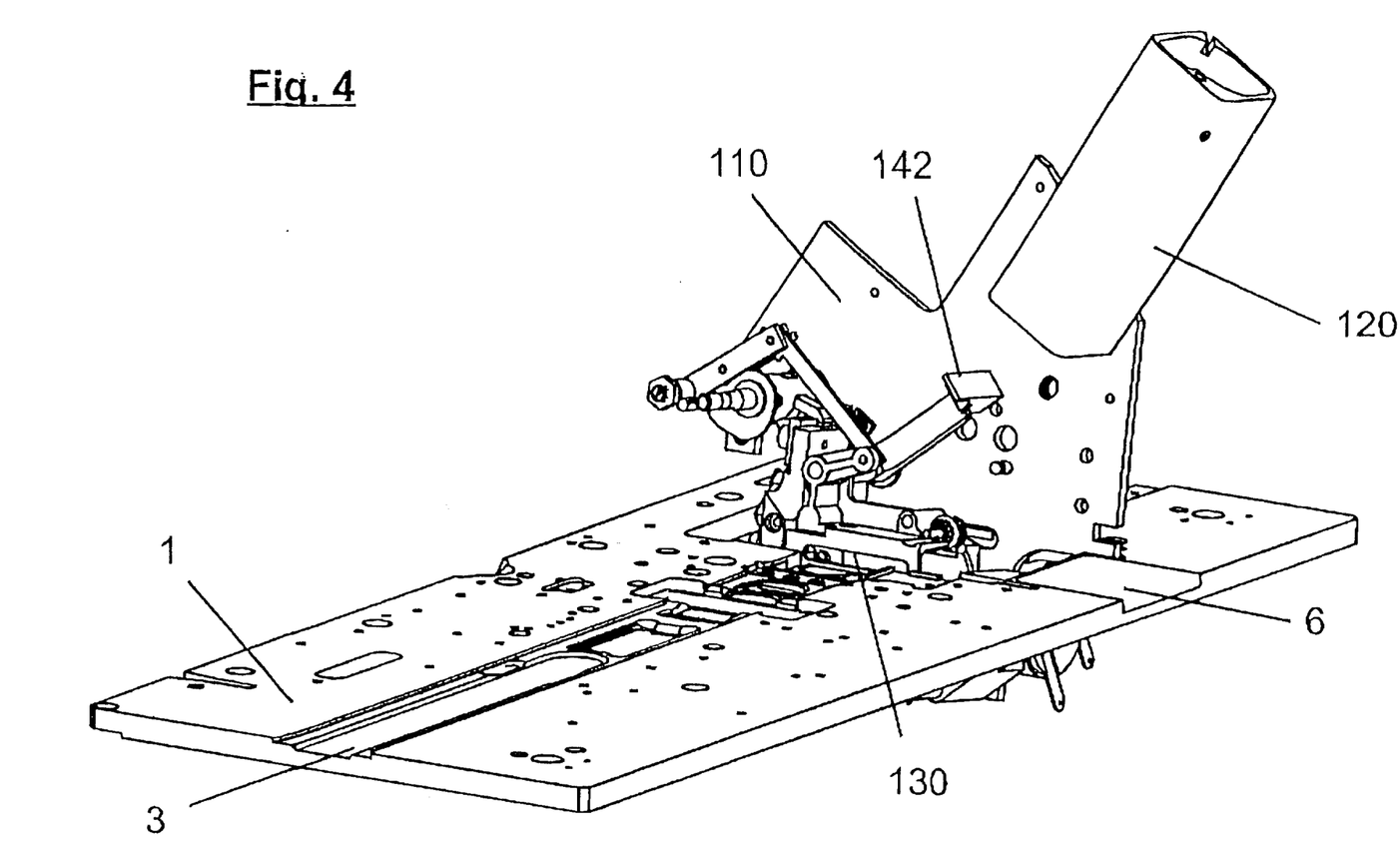
Figure 5:
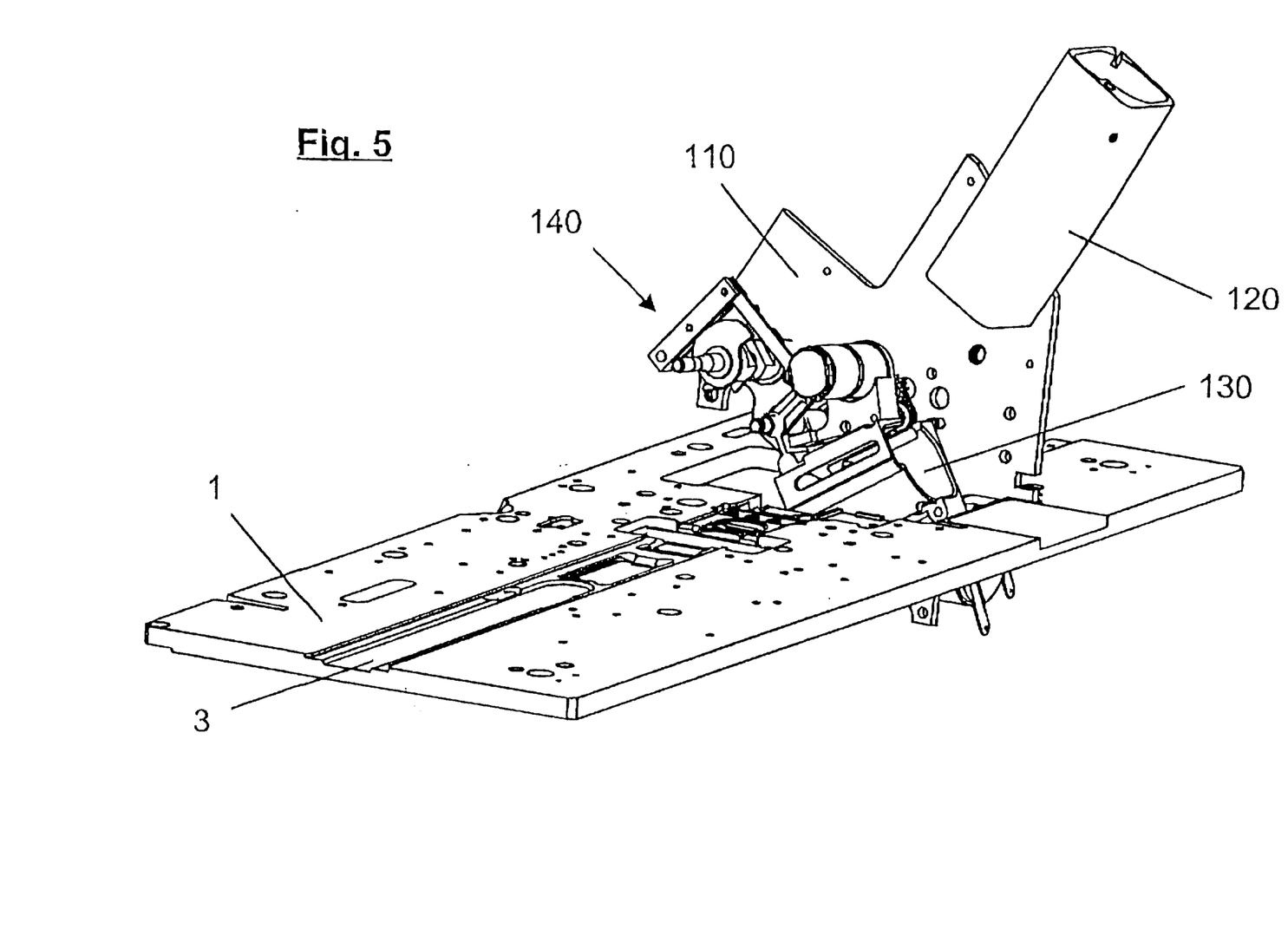

The transfer chamber 130 can be moved by way of the drive mechanism 140 from a loading position as shown in FIG. 3 to an ejection position as shown in FIG. 5 to a working position shown in FIG. 4 and back again, and can thereby transport a cartridge P found therein into the corresponding positions. In the loading position, the transfer chamber 130 is essentially coaxially oriented to the storage chamber 120, and in the working position extends with its axis parallel to the plane of the base plate 1 and perpendicular to the longitudinal direction of the film guide 3. The ejection position is found about in the middle between the loading and the working position. The transfer chamber 130 together with a drive mechanism 140 and the windup and unwind drive 150 form transfer means which fully automatically, sequentially remove cartridges found in the storage chamber 120 therefrom, bringing them into the working position, partially remove the film F (FIG. 10) found in the film cartridge P and pass it along to the film transport means, 11 to 14, and eject the cartridges through the ejection opening 6 after the rewinding of the film F into the cartridge P. This is further discussed in detail below.

The functioning of the loading arrangement or the film platform equipped therewith and the typical movement cycles are best apparent from FIGS. 6 to 12, which show highly simplified views in direction of the arrow A of FIG. 2 or a cross section along the line X—X in FIG. 2 and reduced to the essential.

Figure 6:
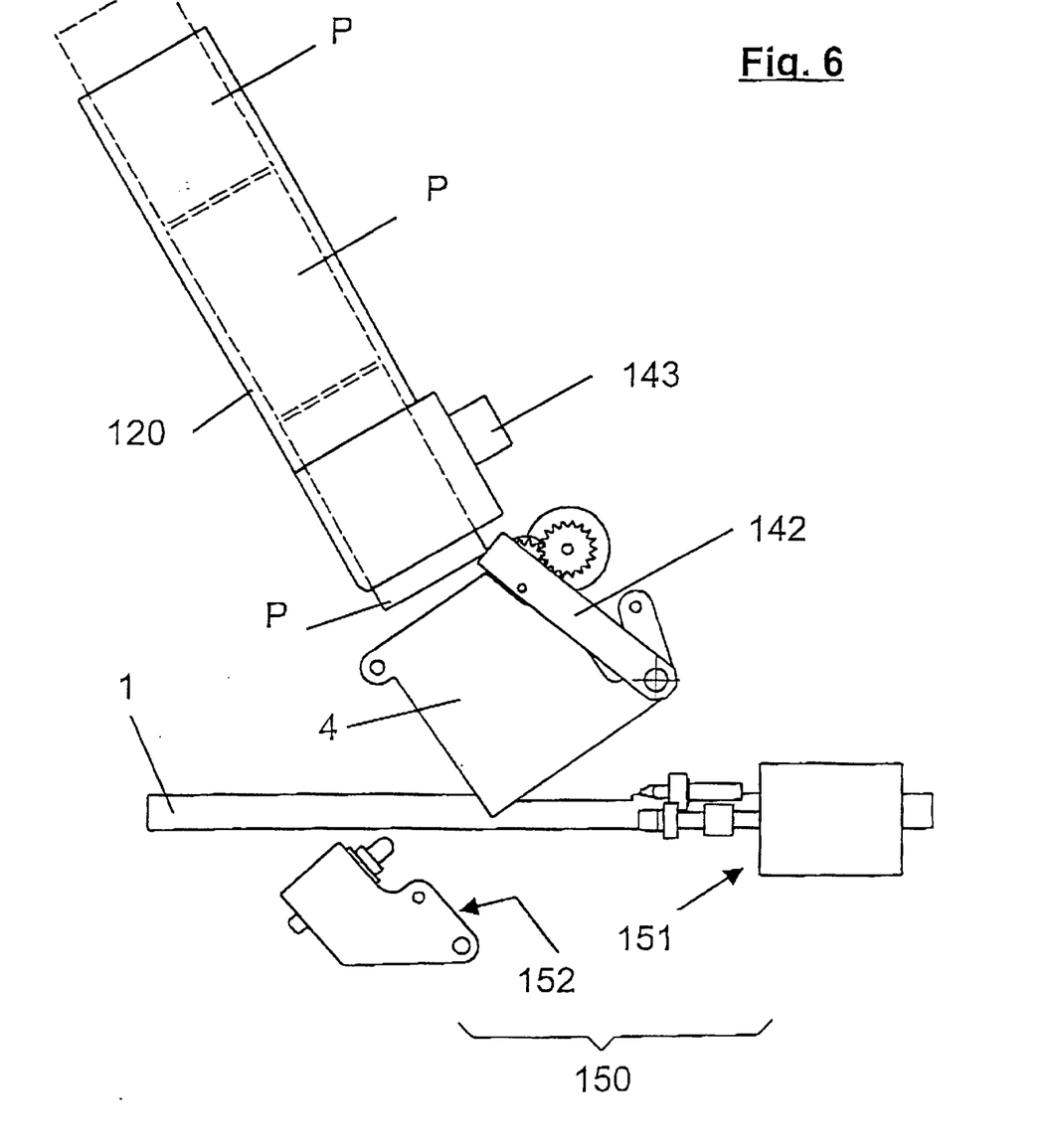
FIGS. 6 to 9 an isolated illustration of the parts of the loading arrangement relevant for the invention and in five characteristic phases of movement.

The operator inserts one or preferably several APS film cartridges P into the storage chamber 120, whereby a latch 142 of the drive mechanism 140 which can be rotated away initially, prevents a falling out of the lowest cartridge P from the downwardly open storage chamber 120. The transfer chamber 130 is thereby not completely coaxially oriented with the storage chamber 120, it is thus somewhat outside of the. extension of the storage chamber 120 (FIG. 6). In or under the plane of the base plate 1 of the film platform, is the already mentioned windup and unwind drive which is designated as a whole with 150 and which essentially consists of a stationary drive unit 151 and a rotatable support unit 152, whereby the latter is also driven by the drive mechanism 140. The stationary drive unit 151 includes essentially a motorized rotating drive 153 for the film winder in the cartridge, as well as an opening pin 154 for the opening of the light flap provided on APS film cartridges. Such opening and drive mechanisms for APS film cartridges are known to the person skilled in the art and, thus, need not be further described.

Figure 7:
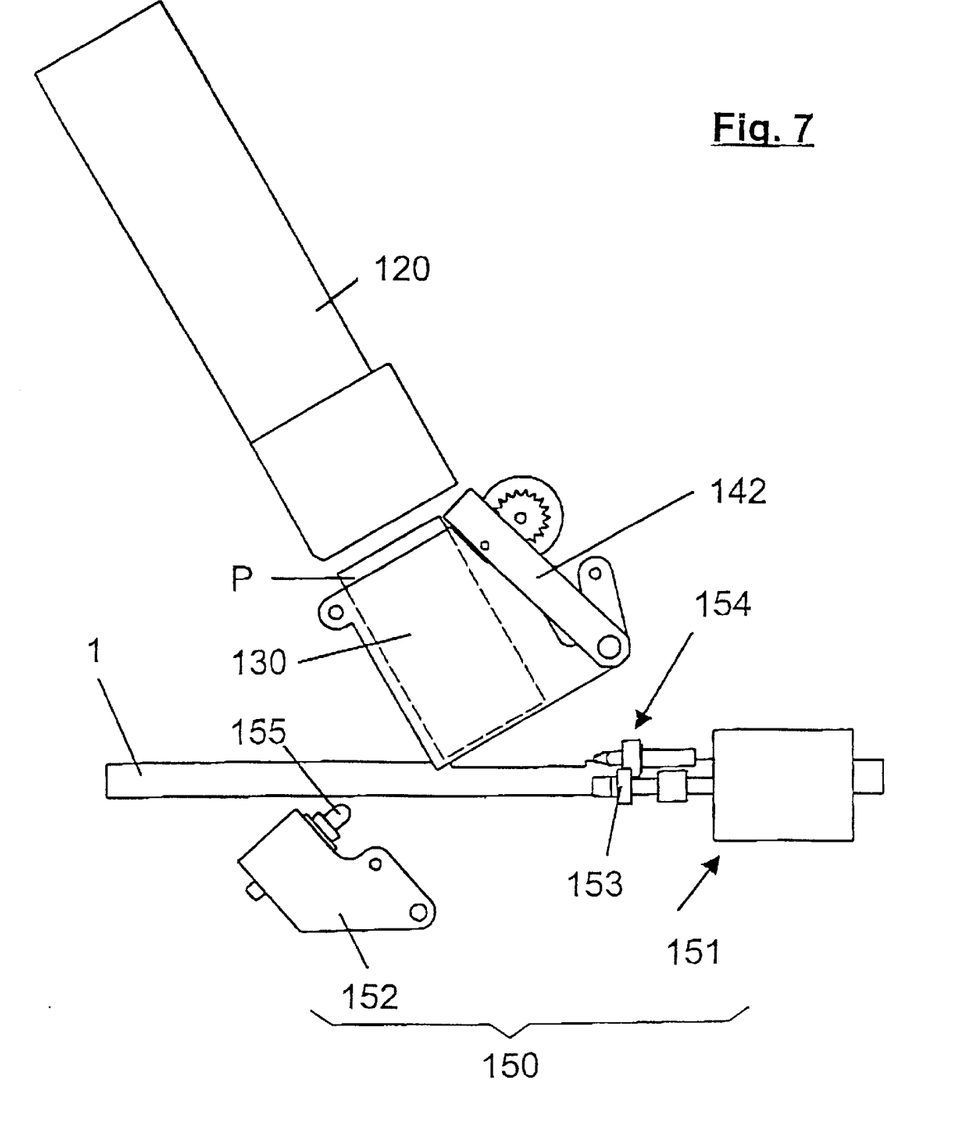

As soon as a light barrier 143 positioned laterally beside the storage chamber 120 signals the presence of a cartridge P in the storage chamber 120, the drive mechanism 140 is activated and swivels the latch 142 aside and the transfer chamber into the extension of the storage chamber 120 so that a cartridge P falls or slides because of its weight from the storage chamber 120 downward and into the transfer chamber 130 (FIG. 7).

Figure 8:
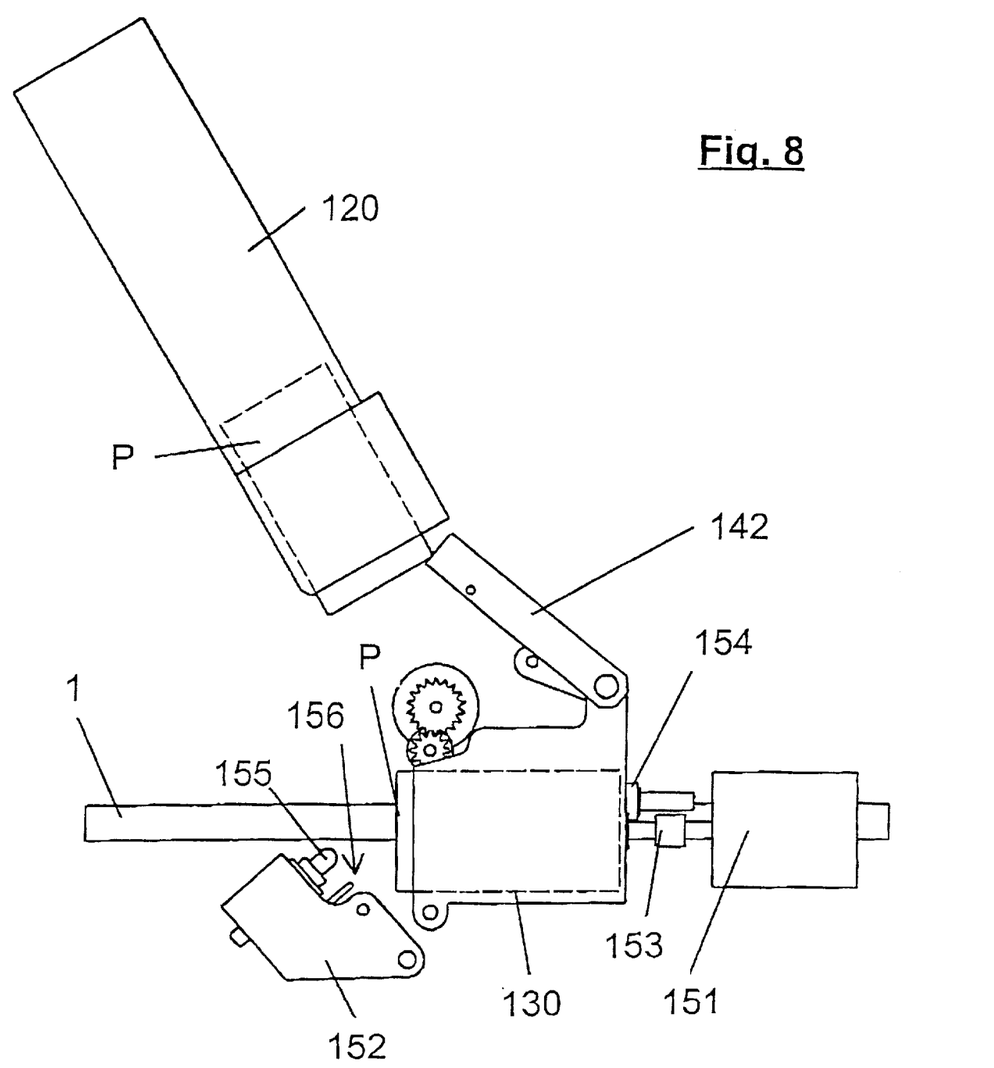
Figure 9:
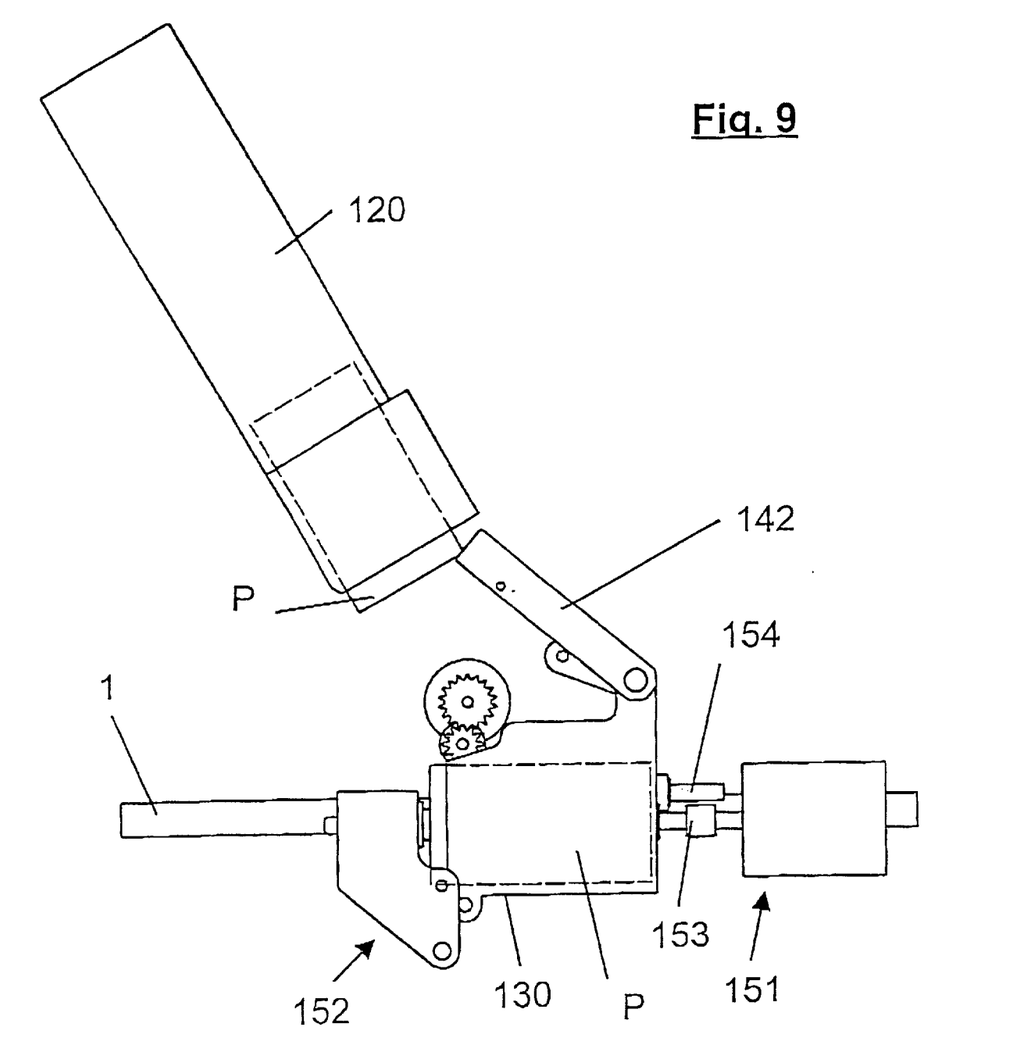

The transfer chamber 130 is thereafter swivelled downwardly into its working position whereby the latch 142 again swivels back into the starting position so that the cartridges sliding ahead cannot fall out of the storage chamber 120 (FIG. 8).

In the working position, the cartridge P which is now in the transfer chamber 130 is coupled to the windup and unwind drive 150. The rotatable supporting unit 152 is thereby moved into the position shown in FIG. 9, whereby a support pin 155 provided therein engages and thereby supports and centers the film windup core in the one cartridge end surface. At the other cartridge end face, the film windup core which protrudes therefrom is brought into engagement with the drive unit 151 of the windup and unwind drive 150 and is in this manner kinematically coupled therewith.

Furthermore, a light barrier 156 is provided in the supporting unit 152 of the windup and unwind drive 150 (FIG. 8), which scans the standard codings at the end face of the cartridge P and thereby determines if a developed film is in the cartridge. If that is not the case, the following operations are skipped and the cartridge ejected as described further below.

Figure 10:
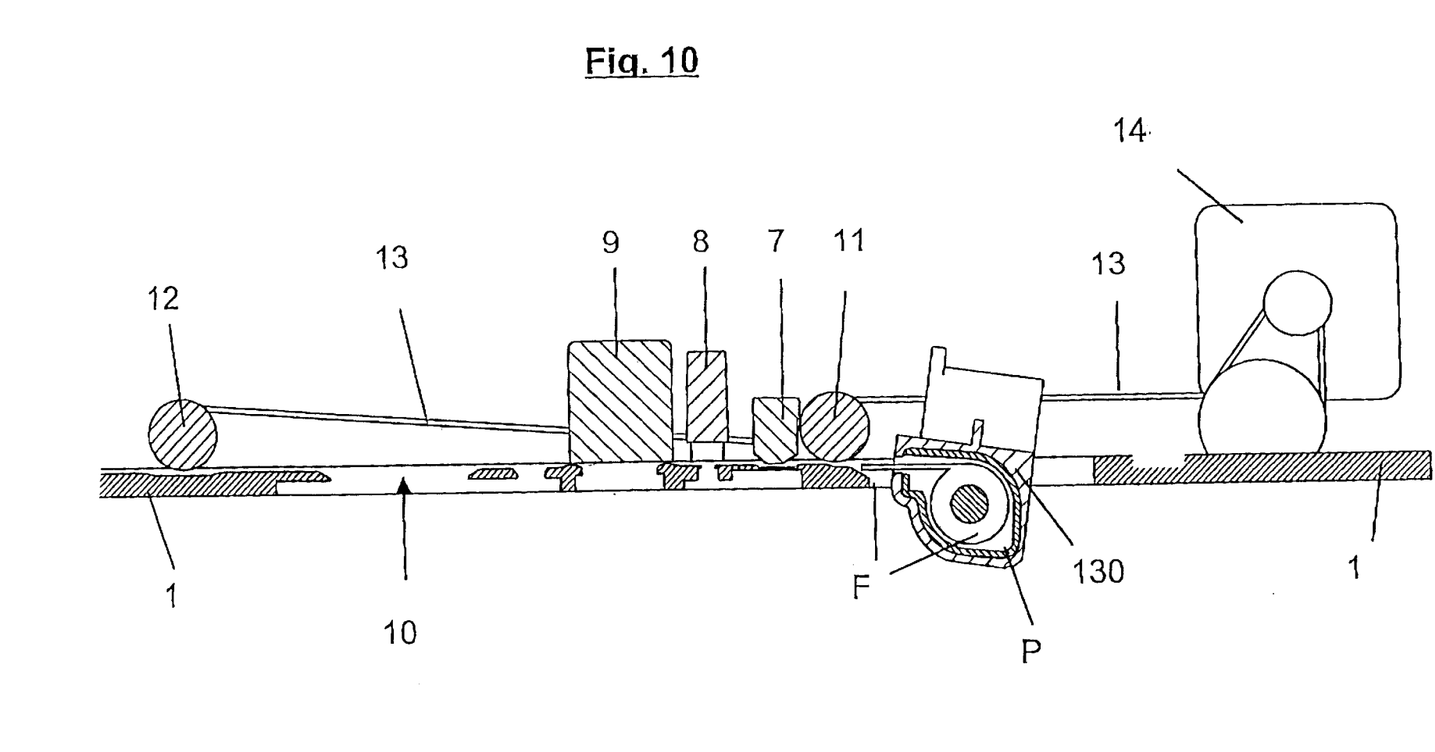
FIG. 10 a section through a portion of the film platform with a film cartridge in working position.

If a developed film is in the cartridge in the working position, the opening pin 154 operates the light flapper in the cartridge P and opens it. The windup and unwind drive 150 is then activated and the film F found in the cartridge P pushed out of the cartridge until it engages the transport roller 11 of the film transport means on the film stage and, thus, is transferred thereto (FIG. 10). The film is now further pulled from the cartridge by the film transport means and moved in the film guide 3 along a film path across the film platform. The end of the film, however, remains connected with the cartridge or the windup core. During the transport of the film across the film platform, the individual picture frames (negatives) move under different optical and magnetic scanning units 7 to 9 and, finally, reach an exposure position 10 wherein the actual copying process takes place. When all picture frames are copied, film transport means 11 to 14 push the film back into the cartridge, whereby the windup and unwind drive 150 again winds up the film onto thewindup core in the cartridge.

Figure 11:
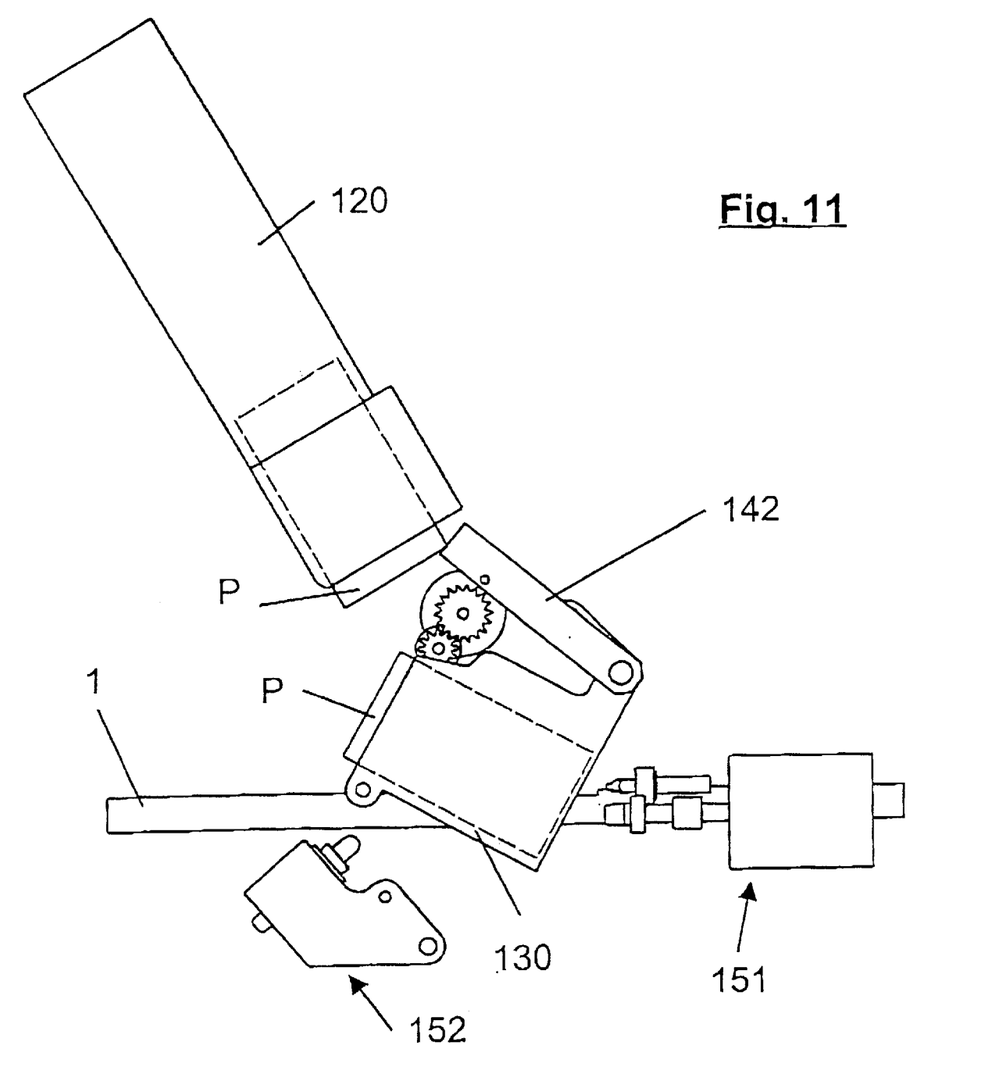
FIGS. 11 and 12 an isolated illustration of the parts of the loading arrangement relevant for the invention and in two further characteristic phases of movement.

The mounting unit 152 of the windup and unwind drive 150 is now swivelled away again into its starting position by way of the drive mechanism 140 and the transfer chamber 130 is moved into its ejection position (FIG. 11).

Figure 12:
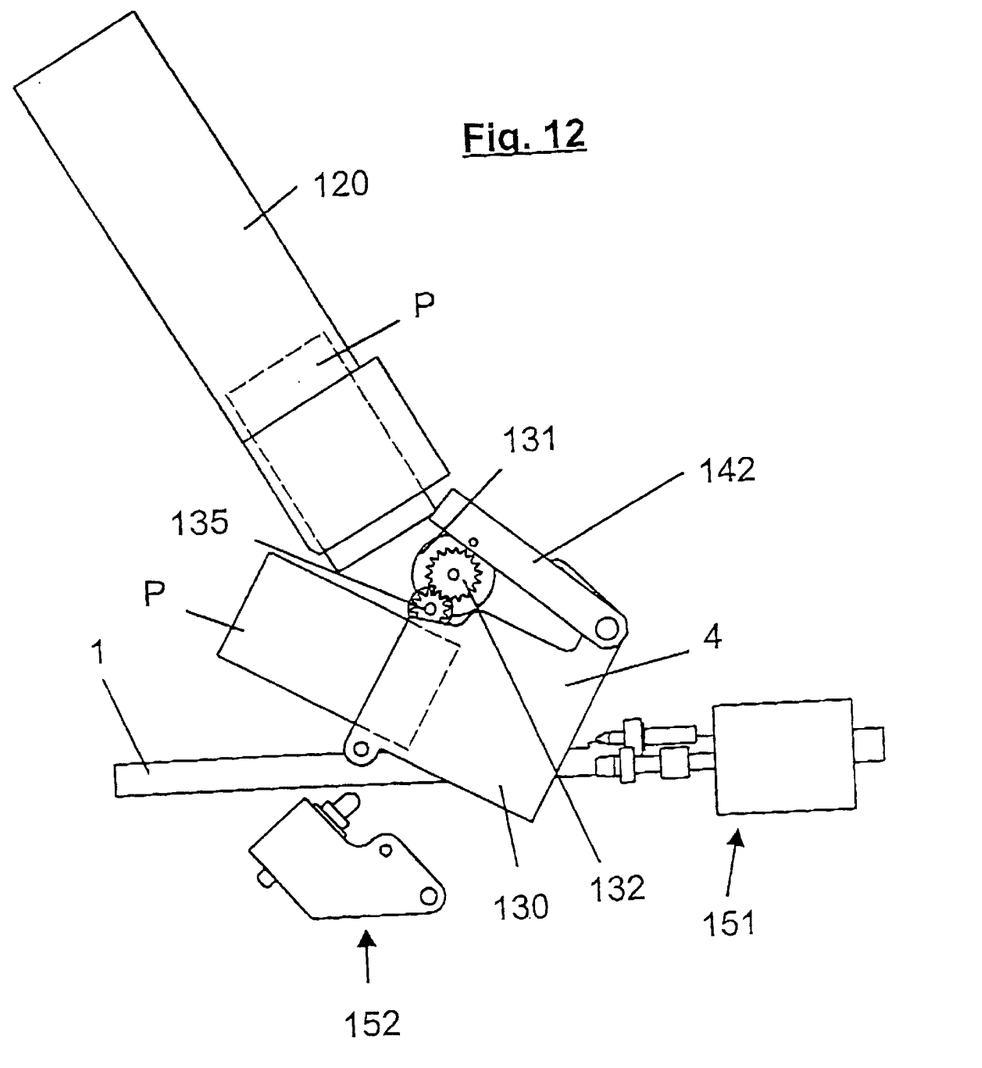

An ejection motor 131 is positioned on the transfer chamber 130 which through sprockets 132 drives a rubber wheel 135 which engages the outer wall of the cartridge P found in the transfer chamber 130. The ejection motor is now activated and the cartridge thereby ejected from the transfer chamber 130 (FIG. 12). The cartridge P falls in the region of the ejection opening 6 of the base plate 1 and can there be removed by the operator.

Subsequently, the transfer chamber 130 is again moved into the loading position (FIG. 6) where it then takes on the next available cartridge P from the storage chamber whereby the above-described steps are repeated in the same manner until the storage chamber includes no more cartridge.

As already mentioned, the invention is primarily intended for use in connection with APS films or APS film cartridges. It is however, of course, also useable for each other film type which during the processing, remains in the cartridge or is wound back into the cartridge after the processing.

What is claimed is:

1. Loading arrangement for loading a photographic copier with a film cartridge containing a film, wherein the film is partially removed from the cartridge for processing and after processing is wound back into the cartridge, said arrangement comprising:

a positioning means for positioning a cartridge in a working position;

a motor-driven unwind means for partially removing a wound film from the cartridge and for transferring the film to a film transport means provided in the copier;

a motor driven windup means for rewinding the film into the cartridge;

a storage chamber for coaxially receiving at least two cartridges in a defined orientation;

a transfer means for sequentially removing a plurality of cartridges one at a time from the storage chamber, for transferring a removed cartridge to the working position where the film contained in the cartridge is partially removed from the cartridge for transfer via the film transport means and for ejecting the cartridge after the film has been rewound by the motor driven windup means.

2. Apparatus according to claim 1, wherein the transfer means comprises:

a motor-driven transfer chamber, shaped and constructed for receiving a single cartridge in a defined orientation, said chamber being moveable from a loading position, to an ejection position, to a working position, and back to the loading position.

3. Apparatus according to claim 2, further comprising:

a second transfer means for transferring a single cartridge from the storage chamber into the transfer chamber while the transfer chamber is in the loading position.

4. Apparatus according to claim 2, further comprising:

a testing means for scanning a coding on the cartridge to determine whether a cartridge located in the transfer chamber includes a developed film.

5. Apparatus according to claim 2, further comprising:

an ejection means for ejecting a cartridge from the transfer chamber when the transfer chamber is in the ejection position.

6. Apparatus according to claim 5 wherein the ejection means are mounted on the transfer chamber and moveable therewith.

7. Apparatus according to claim 2 wherein the motor-driven windup means and the motor-driven unwind means are releasably connectable to a cartridge contained in the transfer chamber when the transfer chamber is in the working position.

8. Film platform for a photographic copier with transport means for transporting the film along a film transport path in an exposure position, said platform comprising a loading arrangement for loading a photographic copier with a film cartridge containing a film, wherein the film is partially removed from the cartridge for processing and after processing is wound back into the cartridge, said arrangement including:

a positioning means for positioning a cartridge in a working position;

a motor driven windup means for rewinding the film into the cartridge;

a storage chamber for coaxially receiving at least two cartridges in a defined orientation;

a transfer means for sequentially removing a plurality of cartridges one at a time from the storage chamber, for transferring a removed cartridge to the working position where the film contained in the cartridge is partially removed from the cartridge for transfer via the film transport means and for ejecting the cartridge after the film has been rewound by the motor driven windup means.

9. Apparatus according to claim 4, wherein the absence of a developed film in the chamber initiates an ejection of the cartridge from the transfer chamber.

* * * * *